United States Patent [19]

Mosser et al.

[11] Patent Number: 5,472,783
[45] Date of Patent: Dec. 5, 1995

[54] COATED ARTICLE

[75] Inventors: Mark F. Mosser, Sellersville; Bruce G. McMordie, Perkasie; Kevin B. Eddinger, Gilbertsville, all of Pa.

[73] Assignee: Sermatech International, Inc., Limerick, Pa.

[21] Appl. No.: 160,366

[22] Filed: Nov. 29, 1993

Related U.S. Application Data

[63] Continuation of Ser. No. 582,151, Sep. 14, 1990, abandoned.

[51] Int. Cl.$^6$ .......................... B32B 27/06; B32B 15/04; B32B 9/04
[52] U.S. Cl. .................. 428/419; 428/421; 428/457; 428/461; 428/463; 428/469; 428/704; 428/908.8
[58] Field of Search .................................. 428/421, 457, 428/463, 469, 419, 704, 461, 908.8

[56] References Cited

U.S. PATENT DOCUMENTS

| | | | |
|---|---|---|---|
| 3,053,693 | 9/1962 | Schuster et al. | 28/341 |
| 3,419,414 | 12/1968 | Marks | 428/421 |
| 3,697,309 | 10/1972 | Werner, Jr. | 427/379 |
| 3,968,289 | 7/1976 | Higbee | 428/195 |
| 4,004,064 | 1/1977 | Kessler | 428/421 |
| 4,172,734 | 10/1979 | Takahashi | 106/1.12 |
| 4,177,320 | 12/1979 | Yoshimura | 428/416 |
| 4,229,495 | 10/1980 | Takahashi | 428/36 |
| 4,610,929 | 9/1986 | Mosser | 428/421 |
| 5,093,403 | 3/1992 | Rau | 524/404 |

FOREIGN PATENT DOCUMENTS

| | | |
|---|---|---|
| 0291260 | 11/1988 | European Pat. Off. . |
| 2185035 | 12/1973 | France . |
| 1266530 | 5/1988 | France . |
| 1019202 | 2/1966 | United Kingdom . |
| 1032833 | 6/1966 | United Kingdom . |

*Primary Examiner*—L. Kiliman
*Attorney, Agent, or Firm*—Reising, Ethington, Barnard & Perry

[57] ABSTRACT

A coated article (10) and method of making the same is disclosed wherein the coated article (10) includes a substrate (12) consisting essentially of titanium or titanium alloy and an outer coating (14) of thermoplastic resin for protecting the substrate from chemical degradation and maintaining stability during exposure to temperatures of at least up to 260° C. An adhesion primer layer (16) is disposed between the substrate (12) and the outer coating (14). The adhesion primer layer (16) includes an inorganic binder matrix for increasing adhesion to the titanium and titanium alloys. The primer layer (16) further includes a thermoplastic resin in particulate form for increasing adhesion to the outer coating (14).

7 Claims, 1 Drawing Sheet

COATED ARTICLE

This is a continuation of application(s) Ser. No. 07/582,151 filed on Sept. 14, 1990 now abandoned.

TECHNICAL FIELD

The present invention relates to coating compositions for protecting titanium or titanium alloys, the coated article, and the method of coating the article. More specifically, the present invention relates to coating compositions which are ideally suited for application to parts, such as aircraft and turbine engine parts, made from titanium and titanium alloys that are exposed to oils and hydraulic fluids at high temperatures.

BACKGROUND ART

The use of titanium alloys in aerospace construction is of significant interest. Titanium alloys have superior strength-to-weight ratios. Densities range between 4.4 and 4.85 gm/cm$^3$ and yield strengths from 172 MPa to 1,880 MPa for different titanium alloys. This combination of high strength and low density results in exceptionally favorable strength-to-weight ratios. These ratios are superior to almost all other metals in the range of temperatures reached in the compressors of aircraft gas turbines making the use of titanium very desirable for weight saving.

In addition to high strength-to-weight ratios, titanium alloys possess excellent erosion resistance, high heat transfer efficiency and good corrosion resistance in most environments. Like stainless steel, in the presence of air titanium alloys form a tightly adherent oxide scale that is self healing and severely reduces material loss due to erosion/corrosion.

In airframe/turbine engine applications, it is desirable to replace ferrous alloys including stainless steels, and some nickel based alloys with titanium alloys to save weight. Presently, titanium alloys account for 7% of the weight of airframe structures for commercial aircraft and 20–25% of weight in such structures used for military applications. Uses include bulkheads, air ducting, fairings, keels, and fuselage panels. In addition, casings and larger structures made by electron beam welding plates of various titanium alloys can be substituted for ferrous materials.

One obstacle to greater utilization of titanium within airframes is its reactivity with hot oils and hydraulic fluids. In aircraft, excess heat, age or catalytic reaction can cause lubricants and hydraulic fluids to decompose to acidic materials which quickly attack titanium structures. One major manufacturer of commercial aircraft has noted that phosphate ester based hydraulic fluid has little effect on most metals up to about 115° C. (240° F.), but that titanium alloys can be severely etched, pitted, and embrittled when exposed to such a fluid at temperatures above 132° C. (270° F.). This corrosion occurs on all of the titanium alloys that could be used in airframe construction. Similar effects are seen on corrosion-resistant steel, often known as CRES, at temperatures above 204° C. (400° F.). Temperatures greater than 132° C. can be generated in a variety of airframe locations—for example, in braking systems and in/near engines and support pylons.

Of the hydraulic fluids and oils most commonly used, phosphate ester type synthetic hydraulic fluid exhibits the most rapid attack on airframe materials. This fluid is used in aircraft because it is fire resistant, e.g., it has a high autoignition temperature and shows little tendency to propagate a flame. In addition to attacking titanium (and steels), it strips most finishes from metals and attacks other organic polymer structures. This phosphate ester hydraulic fluid typically contains dibutyl phenyl phosphate and tributyl phosphate. Typical hydraulic fluids of this type are Skydrol 500B and Skydrol LD manufactured by Monsanto Chemical Company.

When this fluid drips on titanium alloys that are operating at a temperature greater than 132° C. (270° F.), black decomposition products accumulate which contain acidic products such as acid phosphates which rapidly attack the titanium structure.

In the past, use of titanium structures in any area exposed to such hydraulic fluid was forbidden since there was no known way of controlling the attack of the hydraulic fluid on the hot component. The temperature of exposure can be as high as 260° C. (500° F.) and can be produced by cool hydraulic fluid dripping on a hot component or hot hydraulic fluid dripping on a cool component. Because the attack produces embrittlement and pitting, protection must be total since embrittlement and pitting both lead to cracks and catastrophic failure.

Applicant has been quite active in developing and patenting various coating and bonding compositions which are highly suitable for coating various surfaces, particularly metal, to impart protective or other characteristics thereto or which may be used as compositions for bonding two surfaces together. Examples of these compositions are disclosed in the U.S. Pat. Nos. 3,248,251 to Allen, issued Apr. 26, 1966, 4,537,632 issued Aug. 27, 1985, and 4,606,967 issued Aug. 19, 1986, both to Mosser, and U.S. Pat. Nos. 4,617,056, issued Oct. 15, 1986, 4,659,613, issued Apr. 21, 1987, and 4,724,172, issued Feb. 9, 1988, all to Mosser and McMordie. All of the aforementioned patents are assigned to the assignee of the present invention. However, none of the aforementioned patents or other prior art known to applicant addresses the problem inherent in coatings of titanium structures which are exposed to hydraulic fluids at extremely high temperatures. Further, neither applicant nor others skilled in the art have previously been able to provide coatings for controlling the attack of the hydraulic fluid on hot components made from titanium or titanium alloys.

Applicant herein provides a coating, a method of coating an article, and a coated article, all related to titanium and titanium alloys as substrates, which now allows such coated substrates to be used in what was previously forbidden in environments.

SUMMARY OF THE INVENTION

In accordance with the present invention there is provided a coated article including a substrate consisting essentially of titanium or titanium alloy and an outer coating of thermoplastic resin for protecting the substrate from chemical degradation and maintaining stability during exposure to temperatures of at least up to 260° C. An adhesion primer layer is disposed between the substrate and the outer coating. The adhesion primer layer includes an inorganic binder phase for increasing adhesion to the titanium and titanium alloys and further includes the thermoplastic resin in particulate form for increasing adhesion to the outer coating.

The present invention further provides a method of making the coated article including the steps of forming a substrate from titanium or titanium alloy and adhering an outer coating of thermoplastic resin capable of protecting the substrate against chemical attack and temperatures over 260° C. by applying an adhesion primer layer over the substrate. The primer layer includes an inorganic binder phase increasing adhesion to the substrate and thermoplastic resin in particulate form increasing adhesion to the outer coating.

FIGURES IN THE DRAWINGS

Other advantages of the present invention will be readily appreciated as the same becomes better understood by reference to the following detailed description when considered in connection with the accompanying drawings wherein:

FIG. 1 is a perspective view partially broken away of a substrate coated in accordance with the present invention; and FIG. 2 is a perspective view partially broken away of a second embodiment of the present invention.

DETAILED DESCRIPTION OF THE INVENTION

Figure 1:
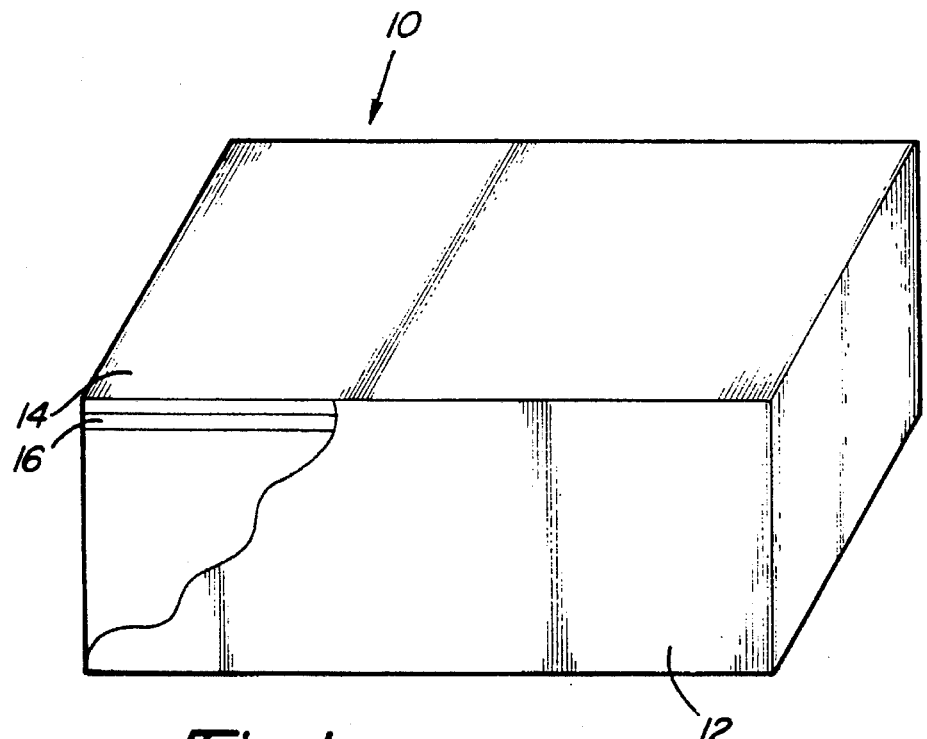

A coated article made in accordance with the present invention is generally shown at 10 in FIG. 1. The article includes a substrate consisting essentially of titanium or titanium alloy. Examples of typical titanium alloys are described in AMS Specification 4911 (6% aluminum, 4% vanadium), AMS Specification 4919 (6% aluminum, 2% tin, 4% zironium, 2% molybdenum). Alloys are described further in U.S. Military Specification MIL-T-9046. The substrate can be in the form of an airframe component, such as a pylon, that is used for securing a jet engine to an aircraft wing or the like. As discussed above, these pylons are commonly exposed to hot hydraulic fluid dripping on a cool substrate or alternatively, the exposure can be to cool fluid dripping on a high temperature substrate.

Although titanium and titanium alloys are preferred substrates in these applications because of their relatively lighter weight compared to ferrous alloys, the present invention can be suitable for use on other related corrosion resistant metals, such as stainless steel.

The coated article 10 includes an outer coating 14 of thermoplastic resin for protecting the substrate from chemical degradation and maintaining stability during exposure to temperatures over 260° C. (500° F.). The thermoplastic resin can be selected from the group including, but not limited to, fluorinated ethylene/proplyene copolymer (FEP), polytetra fluoroethylene (PTFE), polyfluoroalkoxy resins (PFA), polyvinylidene fluoride (PVF$_2$), trifluorochloro-ethylene, and polyphenylene sulfide (PPS).

These resins are useful because they share a series of properties. The resins are all generally considered to be resistant to most chemicals. The resins further are all useful at elevated temperatures, for example, greater than 120° C. (250° F.). Some of these resins are stable during prolonged exposure to temperatures over 260° C. (500° F.). Additionally, the resins are all thermoplastic. Accordingly, the resins all melt and flow thereby forming films having significant cohesive strength. The resins set forth above are not attacked by hydraulic fluids or the decomposition products of hydraulic fluids.

Prior to the development of the present invention, it has been demonstrated that although the coatings listed above and coatings similar thereto and films containing the above listed thermoplastic polymers can be applied to substrates like titanium, they suffer from poor adhesion. In addition, in areas where such films have imperfections, such as pin holes, there is ready access to the substrate. At these pin holes, rapid localized attack can be initiated.

The present invention addresses the aforementioned problems by providing an adhesion primer layer 16 disposed between the substrate 12 and the outer coating 14. The adhesion primer layer 16 includes an inorganic binder phase for increasing adhesion to the titanium and titanium alloys and related metals. The adhesion primer layer 16 further includes thermoplastic resin in particulate form for increasing adhesion to the outer coating 14. In other words, applicant has found that adhesion of the protective thermoplastic films forming the outer layer 14 is greatly improved if the film is applied on the primer layer 16 which contains an inorganic binder phase and the high temperature thermoplastic resin in particulate form.

Although applicant has utilized similar coatings in other environments, applicant has discovered, as claimed herein, that such coatings are useful in combination with substrates made from titanium, titanium alloys, and related metals for the protection of these metals in the aggressive environment set forth above. Moreover, applicant has discovered these coating compositions to include an oil and hydraulic fluid decomposition product protection component for protecting the titanium, titanium alloy, and related metals from the high temperature acids produced by the decomposition of oils and hydraulic fluids.

Generally, the primer layer 16 includes a cured binder or matrix phase prepared by thermally curing a primer slurry consisting essentially of an aqueous solution of a combination of inorganic compounds from the group consisting of phosphoric acid, chromic acid, molybdic acid and metal salts of these acids. Preferred solutions contain phosphate anion and chromate (or dichromate) and/or molybdate anions. Such coating composition binders are disclosed in the U.S. Pat. Nos. 3,248,251 to Allen, 3,869,293 to Brumbaugh, and 4,537,632 to Mosser.

The primer layer can include certain pigments for further increasing the adhesion of the outer coating 14 thereto. Specifically, pulverulent aluminum is beneficial in such primer layers in that the pulverulent aluminum bonds tenaciously to all of the thermoplastic resins listed above. Additionally, aluminum metal does not oxidize during the cure cycle required for the resin in the outer coating 14 and further improves adhesion. An additional benefit of the pigment is that if the outer coating 14 has pin holes or other imperfections, the aluminum powder in the primer layer 16 can react with the acid phosphates or other acidic compounds produced by decomposing hydraulic or other fluid thereby neutralizing the effects of the acid and preventing corrosion.

Preferably, the aluminum powder consists essentially of atomized aluminum spheroids. Such particles are disclosed in the U.S. Pat. No. 4,537,632 to Mosser, assigned to the assignee of the present invention.

Although aluminum powder is the preferred pigment, other insoluble inorganic and metallic particles can be incorporated into the binder. Among these inorganic particles are chromium and zinc. Furthermore, other additives, pigments can be included in the film.

Figure 2:
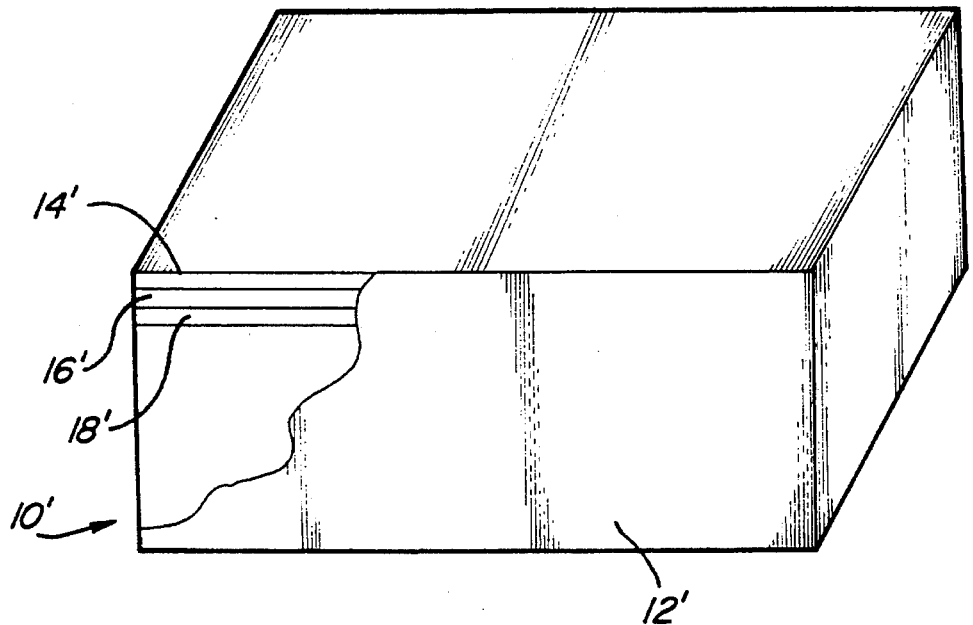

As shown in FIG. 1, the primer layer 16 can be applied directly over the surface of the substrate 12. Alternatively, as shown in FIG. 2 wherein primed numerals are used to indicate like structure between the several embodiments, the primer layer 16 can be applied over a sublayer 18 containing aluminum or aluminum alloys. This sublayer can be in the form of aluminum powder thermally sprayed using powder plasma, arc wire or similar techniques. Alternatively, the aluminum layer can be applied by physical vapor deposition, specifically ion vapor deposition. The sublayer 18 may also consist of aluminum/ceramic coatings such as those described in the U.S. Pat. Nos. 3,248,251 to Allen, 4,537,632 and 4,606,967 to Mosser, and 4,617,056, 4,659,613 and 4,724,172 to Mosser and McMordie. These coatings are of particular significance because of their exceptionally high bond strength, high temperature stability, and ease of application to a wide variety of structures.

The aluminum sublayer insures that if the barrier polymer outer coating 14 or primer layer 16 fails in service, the substrate 12 will still be protected from the hydraulic fluid by a layer 18 capable of reacting with the fluid and neutralizing its effects. Although it is possible that this layer may add undesired weight to the final coated product, the ambient condition of the coated article may be such that the benefit of the additional layer providing protection to the substrate 12 will out-weight the cost of the additional weight.

As stated above, the primer layer 16 includes a high temperature thermoplastic resin in particulate form and a bonding agent. Optimally, other pigments, particularly metal powders, can be added to this layer. The bonding agent may be a metal powder and the metal powder/thermoplastic resin may be applied by thermal spray techniques. Although different compositions are described in the U.S. Pat. No. 3,723,165 to Longo et al, the Longo patent does disclose that such composite materials can be thermally sprayed onto a substrate surface. In addition to this thermal spray technique, the resin or resin/metal pigment mixtures can be compounded in inorganic binders such as acid phosphates, chromate/phosphates, or inorganic silicates, as disclosed in the above cited Allen patent.

With regard to the thermoplastic resin in particulate form, the size of the resin particles can vary from colloidal to about 150 microns (100 mesh) with typical sizes being between 5 microns to 100 microns. The primer layer composition is designed such that after application to the substrate surface and thermal cure, if required, the resin particles are present on the surface of the primer layer. This is critical because these particles are useful in bonding the outer coating film 14 to the primer layer 16.

Thermal cure of the inorganic primers is usually carried out at temperatures between 232° C. (450° F.) and 371° C. (700° F.) to cure the inorganic binder portion of the primer layer 16 and to sinter the particulate resin portion.

Preferably, the outer coating 14 includes the same or similar resin as the primer resin 16. For example, a primer layer may utilize polytetra fluoroethylene (PTFE) as a pigment. A subsequent barrier film forming the outer coating 14 may contain fluorinated ethylene proplyene (FEP) or polyfluoroalkoxy resin (PFA) provided that the top coat film forming the outer coating 14 is heated at least to 360° C. (680° F.) to partially melt the particles of PTFE resin in the primer as well as the resin in the outer coating 14. In this manner, the resins are bonded thereby bonding together the two layers.

The outer coating 14 can be prepared as a slurry of solvent carriers and finely divided resin or it may be preformed film. Solvent carriers used will vary with the resin selected. PPS resin is usually applied from a water dispersion. Thin film FEP and PTFE coatings are also applied via a water borne slurry. $PVF_2$ resin normally is combined with a mixture of solvents and diluents to provide viscosity control after the resin has melted. Additionally, both the outer coating 14 and primer layer 16 may include other components, such as surfactants, to improve the fluid characteristics of the coating to be compatible and form desirable films over particular substrates.

An alternative method of applying the outer coating 14 is by the coalescence of electrostatically deposited resin powder to form a film during subsequent thermal treatment. The film itself would then be applied to the primer layer 16 and thermally cured therewith to bond the two layers together.

EXPERIMENTAL EXAMPLES

In general, evaluation of the coating systems used and made in accordance with the present invention to meet end user requirements is done by heating a horizontal titanium alloy panel to a suitable test temperature, as high as 260° C. (500°). Then, hydraulic fluid is dripped onto the panel at a slow constant rate. Decomposition occurs and a black char-like substance remains. Every 24 hours, the specimen is cooled and the char scraped off with a blunt wood scraper. After clean up, the test is continued until four 24 hour cycles have been completed. Finally, the coating is removed entirely and any weight changes noted in addition to any erosion, pits, or other indications of attack. Quantitative evaluation may include measurement of yield strength changes or fatigue testing may be undertaken to insure that there have been no undesirable effects on the substrate.

Although other test methods are possible, the one described above simulates a typical airframe application where a leaking hydraulic line drips fluid on a hot airframe component.

EXAMPLE I

A primer was prepared by manufacturing the following binder A (Taken from U.S. Patent to Allen discussed above, example 7).

| Binder A | |
|---|---|
| Deionized Water | 800 milliliters |
| Phosphoric Acid (85%) | 220 milliliters |
| Chromic Acid | 92 grams |
| Magnesium Oxide | 152 grams |
| Primer | |
| Binder A | 1750 milliliters |
| Deionized Water | 1750 milliliters |
| Aluminum Powder, air atomized, 5.5 um ave. particle size | 1225 grams |
| Polyphenylene Sulfide resin powder (Ryton V-1 grade) (Phillips Petroleum Co.) | 1435 grams |
| Surfactant, Triton X-100 (Rohm and Haas Co.) | 10 grams |

The primer was mixed and screened through a 100 mesh (150 μm) screen. The primer was spray applied to a titanium alloy panel that had been blasted with 100 mesh (150 pm) aluminum oxide. The primer was cured at 343° C. (650° F.) for 30 minutes, then cooled.

A polyphenylene sulfide topcoat was prepared as follows:

| | |
|---|---|
| Deionized water | 1900 milliliters |
| Glycerol | 1667 milliliters |
| Surfactant, Triton X-100 (Rohm & Haas Co.) | 266 milliliters |

| | |
|---|---|
| Polyphenylene Sulfide Resin (Ryton V-1 Grade) | 1333 grams |
| Titanium Dioxide rutile pigment grade | 320 grams |

The ingredients were added in order, stirred, and then ball milled for 24 hours. This topcoat was spray applied over the cured primer layer and then cured at 371° C. (700° F.) for 30 minutes. A second coat was applied and cured in the same way. Total coating thickness was 90 μm (0.0035 inches).

Primed and topcoated panels titanium alloy panels were exposed to the dripping hydraulic fluid (Skydrol) test for 96 hours at 232° C. (450° F.) and exhibited no weight change or evidence of pitting. Bare titanium alloy panels were severely eroded by the same exposure.

EXAMPLE II

Sheet titanium alloy panels (AMS 4911) were solvent degreased, grit blasted with 100 mesh (150 am) aluminum oxide, then coated with an aluminum coating described in U.S. Pat. No. 4,724,172 example 7, to Mosser and McMordie, dried at 80° C. (176° F.) for 30 minutes, then cured at 343° C. (650° F.) for 30 minutes. After cooling to ambient temperature, a second coat was applied, dried, and cured. A total of 125 (0.0049 inches) average coating thickness was applied.

This aluminum/ceramic layer was primed and topcoated with the coating primer and topcoat described in Example I. When tested per the procedure described in Example I, it showed corrosion resistance at least equivalent to that of the primed and topcoated panels described in Example I.

EXAMPLE III

A primer was prepared as follows:

| | |
|---|---|
| Binder A (Example I) | 1000 milliliters |
| Polytetrafluoroethylene dispersion, 60% solids (DuPont T-30) | 1000 milliliters |
| Polytetrafluoroethylene powder, average particle size 3-4 μm (Hostaflon TFVP 9202 (Farbwerke Hoechst AG) | 220 grams |
| Deionized Water | 400 milliliters |

This primer was thoroughly mixed and spray applied to alumina blasted (90–120 mesh) C.P. Titanium panels. It was dried and cured at 371° C. (700° F.) for 40 minutes to cure the binder and fuse the PTFE resin particles. It was topcoated with a proprietary fluorinated ethylene propylene resin dispersion, DuPont 856-204 then cured at 385° C. (725° F.) for 10 minutes. Additional coats of 856-204 were applied and cured at 329° C. (625° F.). This coating showed excellent stability in the Skydrol drip test.

EXAMPLE IV

The PTFE primer described in Example III was applied to blasted C.P. Titanium panels. A fluorinated ethylene propylene (FEP) polymer film, 200 μm (0.008 inches) thick was bonded to this primed surface by heating the panel and film under pressure to 400° C. (752° F.) for 15 minutes. The bonded film showed superior corrosion resistance when immersed in hot synthetic oil at 250° C. (482° F.).

EXAMPLE V

Grit blasted titanium panels were plasma sprayed with an aluminum silicon alloy powder (12% silicon ) having a particle size between 10 μm and 120 μM. A thickness of 150 μm (±25 μm) was applied.

A primer was applied over the plasma coating. The primer composition is as follows:

| Primer | |
|---|---|
| Binder A (Example I) | 945 milliliters |
| Chromic Acid | 278.5 grams |
| Zinc Oxide | 25.6 grams |
| Magnesium Carbonate | 97.5 grams |
| Deionized water | 2840 milliliters |
| Polytetrafluoroethylene dispersion, 60% solids (DuPont T-30) | 3500 milliliters |

The slurry was spray applied over the plasma applied coating and allowed to air dry. It was cured at 371° C. (700° F.) for 30 minutes.

A polytetrafluoroethylene (PTFE) thin film water borne topcoat was spray applied over the cured primer. A DuPont 850-204 coating was used. Two coating layers were applied and cured at 385° C. (725° F.). The coating system showed superior adhesion and good resistance to hot hydraulic fluid.

The above examples demonstrate the ability of the present invention to provide a coated article with means for protecting titanium or titanium alloy substrate from acids produced by decomposition products of oils and hydraulic fluids at temperatures up to 260° C. (500°). The examples demonstrate the ability of either embodiment illustrated in FIGS. 1 and 2 to provide corrosion protection in a severe chemical and heat environment.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A coated article (10') consisting essentially of a substrate (12') selected from the group consisting of titanium and a titanium alloy; an outer coating (14') consisting essentially of polyphenylene sulfide resin for protecting said substrate (12') from chemical degradation by acid decomposition and maintaining stability during exposure to temperatures of 400° to 500° F.; an adhesion primer layer (16') disposed between said substrate (12') and said outer coating (14'), said adhesion primer layer (16') including an inorganic binder phase containing a reactive metal powder for increasing adhesion to said titanium and titanium alloys and thermoplastic resin particles for increasing adhesion to said outer coating (14'), said thermoplastic resin particles consisting essentially of polyphenylene sulfide resin; and a sublayer (18') between said substrate (12') and said primer layer (16'), said sublayer (18') selected from the group consisting essentially of aluminum, aluminum alloy and aluminum ceramic.

2. An article as set forth in claim 1 wherein said metal powder consists essentially of pulverulent aluminum powder.

3. An article as set forth in claim 1 wherein said sublayer (18') consists essentially of thermally sprayed aluminum powder.

4. An article as set forth in claim 2 wherein said aluminum powder consists essentially of atomized aluminum spheroids.

5. An article as set forth in claim 1 wherein said sublayer (18') consists essentially of aluminum applied by vapor deposition.

6. An article as set forth in claim 1 wherein said inorganic binder includes an aqueous solution of phosphate ions and chromate ions and molybdate ions.

7. An article as set forth in claim 1 wherein said primer layer (16') includes an interface surface disposed against said outer coating (14'), said primer layer (16') including at least some of said thermoplastic resin particles at said interface surface for bonding said primer layer (16') to said outer coating (14').

* * * * *

UNITED STATES PATENT AND TRADEMARK OFFICE
CERTIFICATE OF CORRECTION

PATENT NO. : 5,472,783
DATED : December 5, 1995
INVENTOR(S) : Mark F. Mosser, Bruce G. McMordie and Kevin B. Eddinger It is certified that error appears in the above-identified patent and that said Letters Patent is hereby corrected as shown below:

Column 6, line 57, delete "pm" and insert therefor --$\mu$m--.

Column 7, line 22, delete "am" and insert therefor --$\mu$m--.

Column 7, line 28, after "125" insert --$\mu$m--.

Column 8, line 7, delete "$\mu$M" and insert therefor --$\mu$m--.

Column 8, line 58, delete "500" and insert therefor --550--.

Signed and Sealed this

Eighteenth Day of March, 1997

BRUCE LEHMAN

*Attest:*

*Attesting Officer*  *Commissioner of Patents and Trademarks*